United States Patent [19]
Anderson et al.

[11] 3,927,537
[45] Dec. 23, 1975

[54] OVERLOAD COUPLING

[75] Inventors: Norman J. Anderson, Fairview; Jon R. Mancusco, Erie, both of Pa.

[73] Assignee: Zurn Industries, Inc., Erie, Pa.

[22] Filed: Aug. 1, 1974

[21] Appl. No.: 493,556

[52] U.S. Cl. .................. 64/28; 403/335; 192/56
[51] Int. Cl.² ........................................ F16D 7/00
[58] Field of Search ............... 64/28 R, 29; 192/56; 403/326, 335, 336

[56] References Cited
UNITED STATES PATENTS

| | | | |
|---|---|---|---|
| 998,615 | 7/1911 | Huneke | 192/56 R |
| 2,045,572 | 6/1936 | Dow | 192/56 R |
| 2,128,715 | 8/1938 | Reich | 192/56 R X |
| 2,137,417 | 11/1938 | Schaefer | 192/56 R |
| 2,443,213 | 6/1948 | Weber | 64/29 |
| 2,959,945 | 11/1960 | Hugo et al. | 64/29 |
| 3,546,897 | 12/1970 | Kenny | 64/29 |

OTHER PUBLICATIONS

German Printed Application 1,039,984, 10/1958, Monforts.

*Primary Examiner*—Andrew V. Kundrat
*Attorney, Agent, or Firm*—Edward W. Goebel, Jr., Esq.

[57] ABSTRACT

In a resettable overload protection coupling, a plurality of coupling pins interconnect a pair of coupling plates. Uniform force detent rings engage grooves in the pins and on one of the plates to allow the coupling pins to move axially when a preselected force is transmitted between the plates, causing the plates to be disconnected from each other.

7 Claims, 4 Drawing Figures

OVERLOAD COUPLING

BACKGROUND OF THE INVENTION

This invention relates to automatic overload release couplings, and more particularly, to such couplings which are resettable through the use of coupling pins.

Mechanical couplings are used to transmit torque from a driving source of power, such as a motor, to a load. Many types of machinery require automatically operating overload protection arrangements which disconnect the load from the driving source of power if the machinery should some how become jammed or otherwise stall. For example, where a motor is driving a load such as a conveyor which transports freight from one location to another, from time to time, the conveyor may become jammed. The torque or turning force of the motor increases while the motor is stalled. If the motor continues to drive the conveyor when it is jammed, the conveyor belt can break or the motor can be damaged, which would cause extended down time. Thus, an overload protection coupling is used to automatically disconnect the motor from the conveyor when the torque level increases beyond some selected value.

Overload protection couplings used in the prior art have taken many forms. One of the forms which is commonly used comprises a coupling having a pair of coupling plates, one of which has a plurality of coupling pins mounted in it. Each of these pins has a conically-shaped end portion which fits into a dimple in the opposite plate. The dimples themselves have substantially the same shape as the conical end of the pin which is lodged in the dimple when the plates are coupled together.

In some of this type of overload couplings, the pins are used as shear pins. When an overload occurs, the increased torque shears the pins so that the driving source of power is uncoupled from the load. After the overload has been corrected, it is necessary to replace the shear pins to reconnect the driving source of power to the load.

Other couplings using coupling pins have the pins spring-biased toward the dimpled clutch plate. The spring force holding the pins into the dimples in the opposite plate is the force which must be overcome to disconnect the driving source of power, such as a motor, from the load. When the load becomes greater than some selected level, the motor torque increases to attempt to continue moving the load. With this increase in torque, the conical shape of the end of the coupling pins and that of the dimples causes the pins to be lifted out of the dimples, against the force of the spring which attempts to hold the coupling pin to the dimples. When the spring force is overcome, the clutch plates are no longer interconnected with each other.

Previous couplings of this type have provided pin locking mechanisms, independent of the biasing springs to lock the coupling pins out of engagement with the dimples upon the occurrence of an overload. These pins had to be reset to reconnect the motor to the load. The resetting mechanism increased the mechanical complexity of the couplings and the number of parts and mechanisms which could wear and fail.

It is an object of this invention to provide an overload protection coupling wherein resettable coupling pins interconnect a pair of adjacent coupling members through the use of a simplified locking mechanism.

It is another object of this invention to provide a resettable, overload protection coupling wherein coupling pins engage dimples or recesses in an adjacent clutch plate without having a spring biasing the coupling pin toward the recess both while the clutch plates are coupled together and while the clutch plates are disconnected from each other.

BRIEF DESCRIPTION OF THE INVENTION

Briefly stated, and in accordance with one aspect of this invention, a resettable overload protection coupling is provided which uses a plurality of coupling pins to interconnect a pair of coupling members or plates. These pins are mounted in apertures about the circumference of one of the plates, while the other of the plates has an equal plurality of recesses or dimples for receiving a first end of these coupling pins. The first end of these coupling pins has a truncated, conical shape and each of the recesses has a corresponding shape. Because of this conical shape of both the pin and the recess, the force between the coupling plates is transmitted axially through these pins.

During the normal operation of this resettable overload protection coupling, uniform force detent rings hold the coupling pins in engagement with the recesses of the opposite coupling plate. Each coupling pin has a pin groove around its circumference, and each aperture has an aperture groove around its circumference as well. A uniform force detent ring is mounted in one of these grooves, and the detent engages the other of these grooves when the truncated conical end of the coupling pin engages the recess. It is the force of this detent ring which prevents the pin from disengaging the recess during normal operation of the overload protection coupling. A substantial increase in the load, above a pre-selected level, causes the detent ring to compress or expand the groove as the case may be, in which it is mounted and, thus, to become disengaged from the other groove. This allows the coupling pin to move axially within the aperture and become disengaged from the recess which its conically shaped end was contacting.

DESCRIPTION OF PREFERRED EMBODIMENTS

Figure 1:
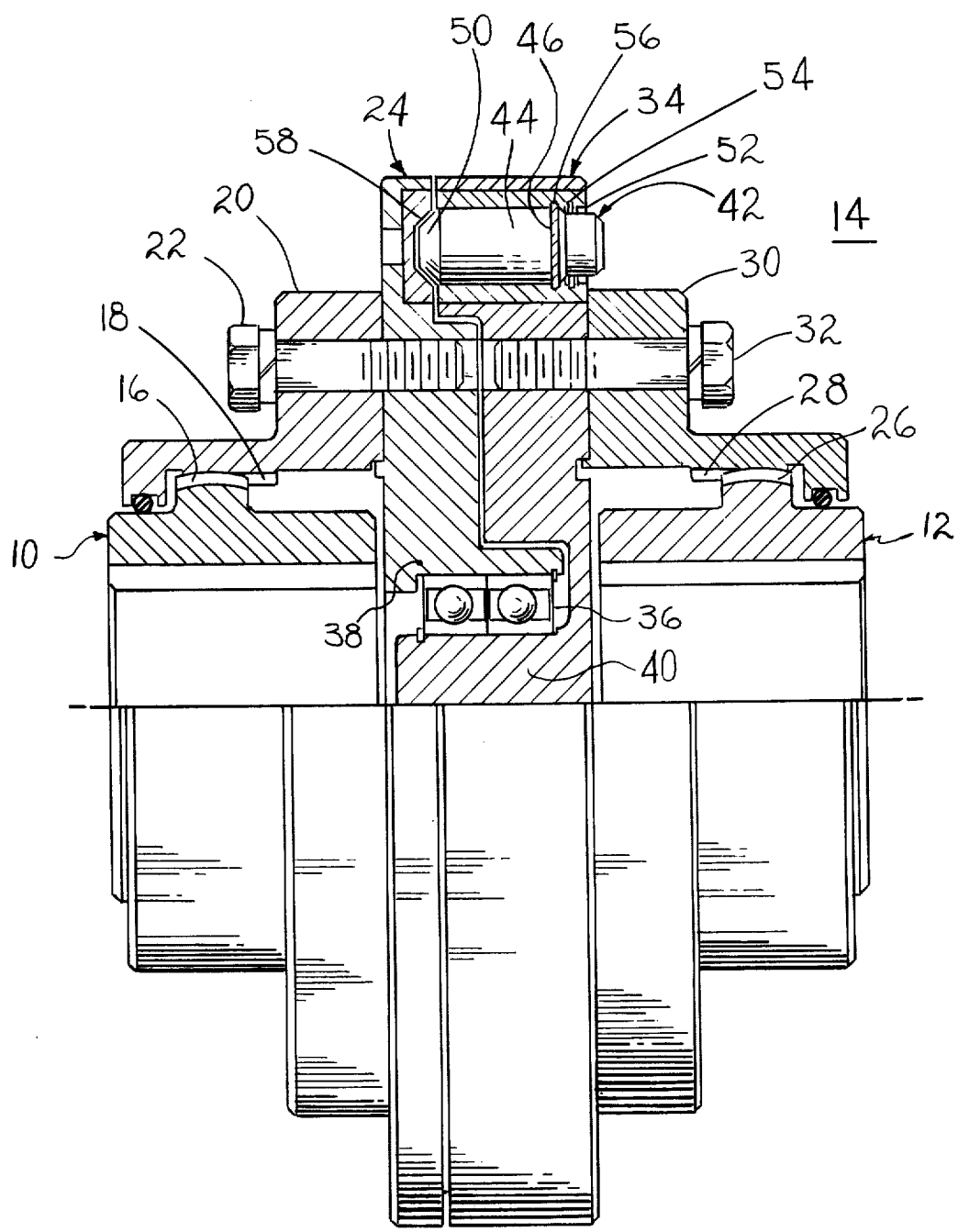
FIG. 1 is a partial cross-sectional view of an overload coupling assembly according to this invention with the coupling plates engaged.

Referring now more specifically to the drawings, and in particular to FIG. 1, the overload protection coupling of this invention is used to interconnect a pair of rotatable shafts. The shafts to be interconnected are to be coupled to hubs 10 and 12 of the coupling 14. By way of example, the shaft connected to the hub 10 may be a driving shaft which itself is connected to some source of power such as a motor. The shaft connected to the hub 12 may be a driven shaft, that is, a shaft connected to a load, such as a pump which is to be driven by the source of power.

The hub 10 is connected through crown teeth 16 to the teeth 18 of a sleeve 20. A plurality of bolts 22 can be used around the circumference of the sleeve 20 to fasten the sleeve 20 to a rotatable clutch member 24.

Similarly, the hub 12 is connected through a plurality of crown teeth 26 and an equal plurality of teeth 28 to a sleeve 30. This sleeve is fastened through a plurality of bolts 32 to a second clutch member 34.

The clutch members 24 and 34 and their associated sleeves and hubs are mounted on the same axis of rotation. Prior to the time when the clutch is engaged, these clutch members 24 and 34 rotate independently of one another, and spacing is maintanined between these clutch members through the use of bearings 36 mounted between a sleeve 38 of the clutch member 24 and a hub 40 of the clutch member 34.

Figure 2:
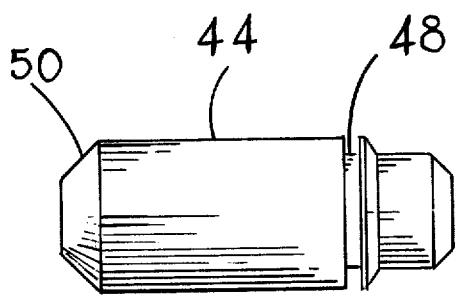
FIG. 2 shows a view of a coupling pin used in accordance with this invention.

In accordance with this invention, the clutch members 24 and 34 are interconnected through the use of a plurality of coupling pin assemblies 42 mounted about the periphery of the clutch 34. The coupling pin assemblies each comprise a coupling pin 44 and a detent ring 46. The coupling pin 44 is more clearly shown in FIG. 2 while the detent ring 46 is more clearly shown in FIG. 3.

The coupling pin 44 includes a pin groove 48 which, in this embodiment of this invention, is made to receive the detent ring 46. The groove 48 must be deep enough to allow the ends of the detent ring 46 to move toward one another during the coupling and uncoupling operations which will be described below.

The end 50 of the coupling pin 44 has a truncated conical shape which is used for the overload protective features of the coupling operation.

Figure 3:
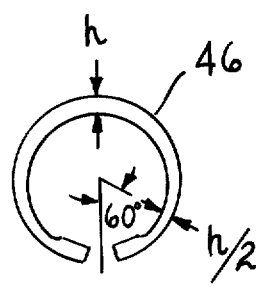
FIG. 3 shows a detent ring used in accordance with a preferred embodiment of this invention.
Figure 4:
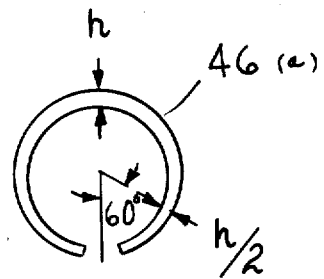
FIG. 4 shows another embodiment of a detent ring used in accordance with a preferred embodiment of this invention.

The detent ring shown in FIG. 3 is of the type known as a uniform force ring in that this ring will compress and its two ends will move together when a preselected force is applied through two or more points about the circumference of this ring.

The coupling pin assemblies 42 are mounted within apertures 52 about the periphery of the clutch member 34. Each of these apertures 52 includes at least one aperture groove adapted to receive the outside circumference of the detent ring 46. In the embodiment of this invention shown in FIG. 1, the aperture 52 has a first aperture groove 54 and a second aperture groove 56. The first aperture groove 54 is in a position such that the detent ring 46 engages this groove while the position of the coupling pin 44 does not allow the clutch members 24 and 34 to be coupled together. The second groove 56, while engaged by the detent ring 46, allows the coupling pin 44 to be in such a position that the clutch members 24 and 34 are interconnected.

The first aperture groove 54 may be eliminated for some applications of this invention. However, the groove 56 is essential to this operation of this coupling because the pressure of the detent ring 46 against the aperture 56 is the force which must be overcome to disconnect the clutch members 24 and 34.

The clutch member 24 includes a plurality of recesses 58, each corresponding to one of the plurality of recesses 58, each corresponding to one of the plurality of coupling pins 44. Each of these recesses has a shape which corresponds to the truncated conical shape of the end 50 of the coupling pin 44.

The clutch member 24 is coupled to the clutch member 34 when the end 50 of the coupling pin 44 engages the recess 58 in the clutch member 44, as shown in FIG. 1. The force of the detent ring 46 against the aperture 56 prevents the coupling pin 44 from moving away from the recess 58. Driving force is transmitted, by way of example, from the hub 10 and through the teeth 16 and 18, the sleeve 20 and the clutch member 24 and through the recesses 58 to the truncated conical end 50 of the coupling pin 44.

Due to the slanted walls of the recess 58 and the conical shape of end 50, the pin 44 is pushed to the right in FIG. 1. The end 50 of the pin 44 is forced in a direction out of the recess 58. However the strength of the detent ring 46 in resisting compression within the recess 58 holds the coupling pin 44 in place until an overload condition occurs. The strength and size of this uniform force detent ring 46 must be calibrated such that a preselected force on the pin 44 forces the ends of the detent ring, in FIG. 3, to move toward one another. When the detent ring compresses, it moves to the right in FIG. 1, out of the groove 56 of the aperture 52. The end 50 of the pin 44 begins to move out of the recess 58.

The groove 54 of the recess 52 is positioned such that at the point when the detent ring 44 leaves the second groove 56 the detent ring 46 begins to enter the groove 54. That is, once the spring force of the detent ring 46 is overcome, the surface of the recesses 58 pushes the conical ends 50 out of these recesses and to the right of the drawing comprising FIG. 1. The contact between the surface of the recess 58 and the end member 50 causes the detent ring 46 to begin to enter the groove 54. The V-shaped slope of the groove 54 causes this detent, and thus the coupling pin 44, to move further to the right. This causes the end member 50 of the coupling pin 44 to move even further out of the path of the rotating clutch member 44.

It is desirable to make the axial force ($F_a$) required to move the detent rings 46 out of the grooves 56 as predictable as possible. However, the use of a normal retaining ring which is constant in cross-section tends to cause the clutch members 24 and 34 to separate at unpredictable axial force levels. Experiments have shown that these normal retaining rings collapse in an oval shape, with the ends of the rings deflecting elliptically. This results in point contact between the rings 46 and the grooves 56, uneven load distribution about the rings 46, and thus, unpredictable force levels at which the clutch members 24 and 34 disconnect.

Thus, the structure of the ring 46 and the groove 56 should cause the contact between these members to tend to be along surface areas, rather than at a few points. For this reason, the detent ring 46 has a structure which causes it to be a uniform force ring. This is, the detent ring 46 collapses uniformally about its circumference, rather than elliptically, as force is applied above the outer surface of the ring. As shown in FIG. 3, the cross section of the radial wall of the ring 46 has a width $h$ 180° from the center of the gap between the ends of the ring. This width of the ring decreases gradually to a width of $h/2$ approximately 60° from the center of this gap at each end of the ring. This varying width of the ring 46 causes the deflection of the ring to be substantially uniform when force is applied to the ring, as through contact with the groove 56. The ends 46 are shown increased in width, but its width may remain at $h/2$ if desired.

The surface of the outside diameter of the ring 46 itself should be rounded to avoid sticking when this surface contacts the groove 56. The cross-section of the groove 56 is trapezoidal in shape. It has been found that the axial force at which the clutch members 24 and 34 separate is more predictable if the radius of the rounded surface of the outside diameter of the ring 46 is tangent to the sloped sides of the groove 56. As an alternative, the outside surface of the ring itself could also be trapezoidal in shape to correspond with the shape of the groove 56.

The axial force $F_a$ at which the coupling plates disconnect is predicted through the use of the formula:
$$F_a = 5P[\text{Tan } \alpha + \text{Tan } \theta]$$
where, $P = Efbh3/2.36 D_m3 =$ radial force produced, $E$ is Youngs modulous for the material used for the detent rings, $f$ is the amount of detent ring must collapse to free the ring from the groove to cause the coupling to disconnect, $D_m$ is the mean diameter of the detent ring, the dimension measured from the middle of the width $h$ of the ring opposite the gap to what would be the middle of the width at the gap if the ends of the ring were extended to the gap, $b$ is the thickness of the ring, uniform about the circumference in the preferred embodiment, Tan$\theta$ is the coefficient of friction between the ring 46 and the groove 56, and $\alpha$ is the angle between the side of the groove 56 and the flat portion of the trapezoidal groove.

This formula was derived and checked empirically and was found to be reasonably accurate for the preferred embodiment of this invention.

It has been found that the sides of the aperture groove 56 may have an angle between them in the range of from about 15° to about 55° for satisfactory operation of this invention.

It is to be understood, of course, that the embodiment of this invention which has been described herein is presented to provide a full and clear description of the invention and is not intended to limit the invention to the details which are shown. For example, it is contemplated that those skilled in the art can so design the clutch members 24 and 34 that one of these would extend radially outwardly of the other and over the other. This would allow the detent pin used in accordance with this invention to be mounted in a radial position with respect to the overload coupling itself.

Furthermore, it is contemplated that a single large aperture ring could be mounted about the circumference of the clutch member 34, at the end of the clutch member 34 where the detent ring is now mounted about the detent pins. this large detent ring would take the place of the single detent ring used on each of the pins in the present embodiment. It would also eliminate the need for the aperture groove shown in the present embodiment. A pair of grooves on each of the pins would be used along with the detent ring.

What we claim as new and desire to obtain by letters patent of the United States is as follows:

1. An overload protection coupling for interconnecting a driving source of power with a driven load comprising, in combination:
    a. A first, rotatable clutch member and a second rotatable clutch member; means for mounting said first clutch member adjacent said second clutch member on the same axis of rotation; means for connecting said first clutch member to a shaft connected to said driving source of power; and means for connecting said second clutch member to a shaft connected to said driven source of power;
    b. One of said clutch members having a plurality of apertures spaced about its circumference; a coupling pin slidably mounted in each of said apertures; the other of said clutch members having a plurality of recesses about its circumference which is equal to said plurality of apertures, with said recesses being so positioned that each of said recesses is engagable by a first end of one of said coupling pins;
    c. Said first end of each of said coupling pins having a truncated conical shape; each of said recesses having a corresponding shape for receiving said first end of said coupling pin to connect said first clutch member to said second clutch member during the normal operation of said coupling; said coupling pins being disengagable from said recesses under overload conditions to disconnect said first clutch member from said second clutch member;
    d. Each of said coupling pins having a pin groove around the circumference of said pin; each of said apertures having an aperture groove around its circumference and a uniform force detent ring being mounted in one of said grooves; said grooves being so positioned that said detent ring engages the other of said grooves when said first end of said coupling pin engages said recess; and said detent ring being disengagable from said other of said grooves when an overload condition occurs and said first end of said coupling pin is disengaged from said recess.

2. An overload protection member according to claim 1 wherein said detent ring is mounted in said pin groove and engages said aperture groove when said coupling pin engages said recess.

3. An overload protection coupling member according to claim 1 wherein said aperture includes a second aperture groove around the circumference of said aperture; said second aperture groove being so positioned that said detent ring engages it when an overload condition occurs.

4. An overload protection coupling member according to claim 3 wherein the position of said second aperture groove is such that said detent ring engages no more than the side of said groove which is adjacent said first aperture groove when an overload occurs and the angle of said side of said second aperture groove causes further travel of said detent ring in to said second aperture groove and pulls said first end of said detent pin into said aperture.

5. An overload protection coupling according to claim 1 wherein the sides of said aperture groove engaging said detent ring are substantially V shaped and the angle between said sides is in the range of from about 15° to about 55°.

6. An overload protection coupling according to claim one wherein said detent ring is mounted in said pin groove and the structure of said detent ring and the shape of said other of said grooves causes the axial force $F_a$ at which said first end of said coupling pin is disengaged from said recess to substantially comprise:
$$F_a = 5P[\text{Tan } \alpha + \text{Tan } \theta]$$
where, $P = Efbh3/2.36 D_m3 =$ radial force produced, $E$ is Youngs modulous for the material used for said detent ring, $f$ is an amount said detent ring must collapse to free said detent ring from said other of said grooves to cause said coupling pin to disengage from said recess, $D_m$ is the mean diameter of said detent ring, the dimension measured from the middle of a width $h$ of said detent ring opposite a gap between ends of said detent ring to what would be the middle of the width at the gap if said ends of said detent ring were extended to the gap, $b$ is the thickness of said detent ring, uniform about the circumference in the preferred embodiment, Tan $\theta$ is the coefficient of friction between said detent ring and said other of said grooves, and $\alpha$ is the angle between the side of said other of said grooves and the portion of said groove opposite said detent ring.

7. An overload protection coupling for interconnecting a driving source of power with a driven load comprising, in combination:
   a. A first, rotatable clutch member and a second rotatable clutch member; means for mounting said first clutch member adjacent said second clutch member on the same axis of rotation; means for connecting said first clutch member to a shaft connected to said driving source of power; and means for connecting said second clutch member to a shaft connected to said driven source of power;
   b. One of said clutch members having a plurality of apertures spaced about its circumference; a coupling pin slidably mounted in each of said apertures; the other of said clutch members having a plurality of recesses about its circumference which is equal to said plurality of apertures with said recesses being so positioned that each of said recesses is engageable by a first end of one of said coupling pins;
   c. Said first end of each of said coupling pins having a truncated conical shape; each of said recesses having a corresponding shape for receiving said first end of said coupling pin to connect said first clutch member to said second clutch member during the normal operation of said coupling; said coupling pins being disengagable from said recesses under overload conditions to disconnect said first clutch member from said second clutch member;
   d. Each of said coupling pins having at least one pin groove about its circumference; uniform force detent ring means of varying width; said clutch member having said plurality of apertures also includes at least one groove for each of said detent ring means; said detent ring means being of such a size that it can simultaneously engage a pin groove on at least one of said coupling pins and a groove on the last mentioned clutch member; said at least one pin groove and said groove on the last mentioned clutch member being so positioned that said detent ring engages them simultaneously when said first end of said coupling pins engages said recesses; and said detent ring means being disengagable from one of said grooves when an overload condition occurs and said first ends of said coupling pins are disengaged from said recesses; and
   e. Said detent ring being mounted in said pin groove and the structure of said detent ring and shape of said one of said grooves from which said detent ring is disengageable causing the axial force $F_a$ at which said first end of said coupling pin is disengaged from said recess to substantially comprise:
   $$F_a = 5P[\text{Tan } \alpha + \text{Tan } \theta]$$
   where,
   $P = Efbh3/2.36 D_m3 =$ radial force produced,
   $E$ is Youngs modulous for the material used for said detent ring,
   $f$ is an amount said detent ring must collapse to free said detent ring from said one of said grooves to cause said coupling pin to disengage from said recess,
   $D_m$ is the mean diameter of said detent ring, the dimension measured from the middle of a width $h$ of said detent ring opposite a gap between ends of said detent ring to what would be the middle of the width at the gap if said ends of said detent ring were extended to the gap,
   $b$ is the thickness of said detent ring, uniform about the circumference in the preferred embodiment,
   Tan $\theta$ is the coefficient of friction between said detent ring and said one of said grooves, and
   $\alpha$ is the angle between the side of said one of said grooves and the portion of said groove opposite said detent ring.

* * * * *